Figure 1:
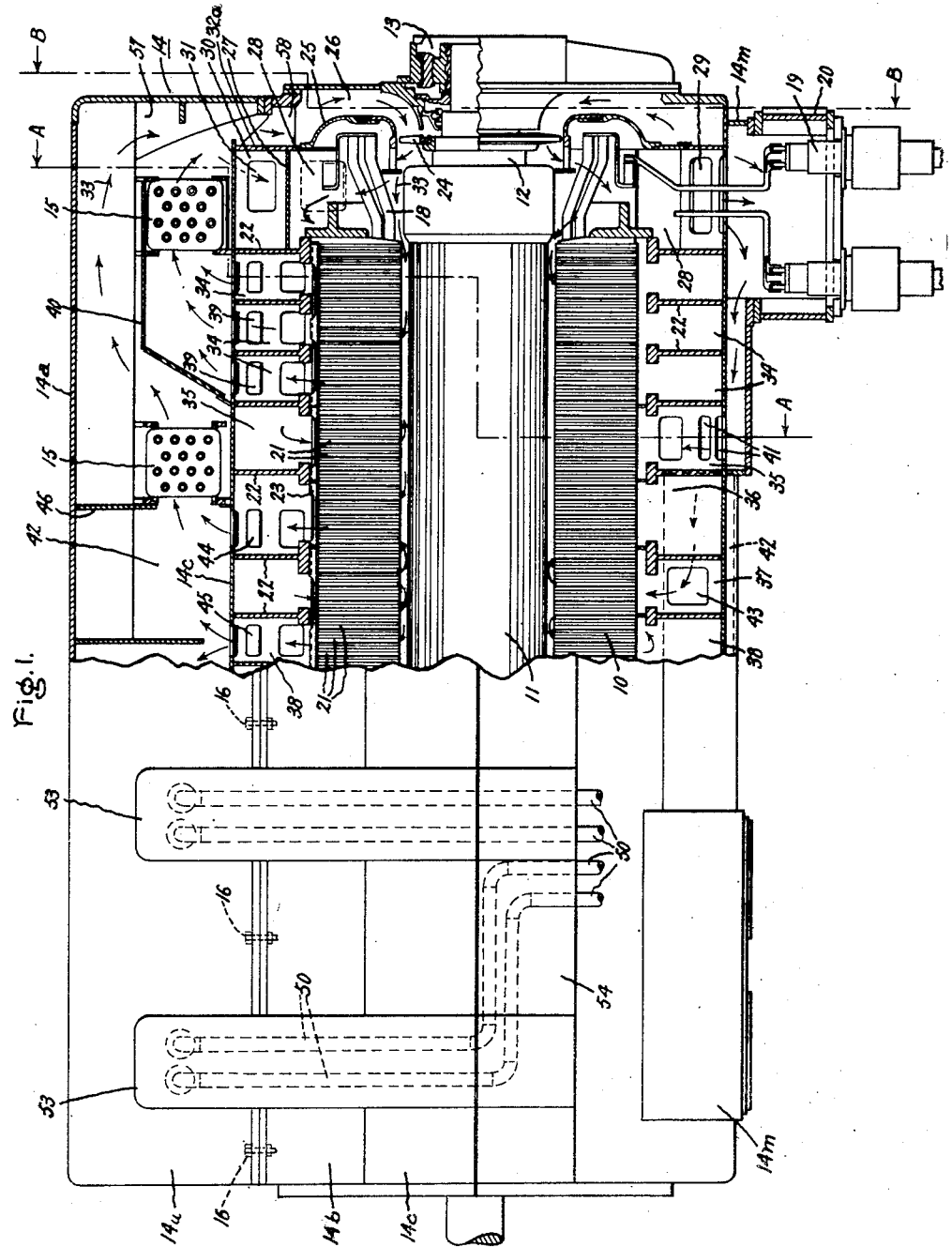

Sept. 1, 1953 J. J. BAHN 2,650,994
GENERATOR WITH REMOVABLE TOP COOLING DOME
Filed June 2, 1952 2 Sheets-Sheet 1

Inventor:
John J. Bahn,
by Richard E. Haley
His Attorney.

Patented Sept. 1, 1953

2,650,994

UNITED STATES PATENT OFFICE 2,650,994

GENERATOR WITH REMOVABLE TOP COOLING DOME

John J. Bahn, Schenectady, N. Y., assignor to General Electric Company, a corporation of New York Application June 2, 1952, Serial No. 291,257

4 Claims. (Cl. 310—57)

My invention relates to dynamoelectric machines and has particular significance in connection with large turbine generators.

Heretofore it has been a practice to construct the stators of very large capacity dynamoelectric machines each in two or more axially or radially split sections which are separately shipped from the manufacturing plant to the place of installation where the sections are bolted together to form the stator. Such constructions have been thought necessary in order not to exceed the capacity, as to weight and size, of available means of transportation, but results in machines each of which has to be assembled twice, once for final fitting and test at the manufacturing plant and again for operation in the customer's plant, and, furthermore, such assemblies require accurate machining of the abutting surfaces of the sectors constituting the stator, and requires that the windings be taken apart after test to again be completed at the customer's plant, as they cannot be left completed when the sectors are separated for shipment. All of this greatly increases the cost of manufacture and of installation. Another practice in the past has been to ship a stator core completely stacked and wound by virtue of going to an interleaved or double supporting frame of the type illustrated and described in Patent 1,689,503, issued October 30, 1928, in the name of M. A. Savage and assigned to the assignee of the present invention, but in many applications such double frame structure has been found very expensive to make and awkward to assemble upon the customer's premises.

It is an object of the present invention to provide simple and inexpensive means for overcoming the abovementioned difficulties.

A further object of the present invention is to provide a substantially completed electrical generator designed to produce more kilowatts of electricity within present-day shipping limits.

A still further object of the present invention is to provide a dynamoelectric machine utilizing a plurality of coolers so arranged that each acts as a single-pass cooler, thereby to eliminate excessive cooler drop and require lower fan pressure for coolant circulation, with consequent decreased running losses.

Broadly stated, in accordance with my invention, I provide a cylindrical housing containing co-operating rotor and stator core members with the stator core having radial cooling spaces, and I reduce the diameter of webs required to support the stator core from the housing by not requiring that they be provided with ducts or holes for coolers or for passing ventilating medium axially. To this end, coolers and the principal axial ventilating medium passages are all located outside of the main cylindrical supporting housing. Furthermore, the coolers are transversely mounted in a removable part of a top dome which can be easily unbolted from the remainder of the machine, separately shipped, and readily assembled on the machine at the installation site, thus allowing the construction of higher capacity machines within present-day shipping limitations while, at the same time, providing the same or greater machine stiffness by the elimination of coolant medium holes in the supporting webs of the machine central portion.

Figure 2:
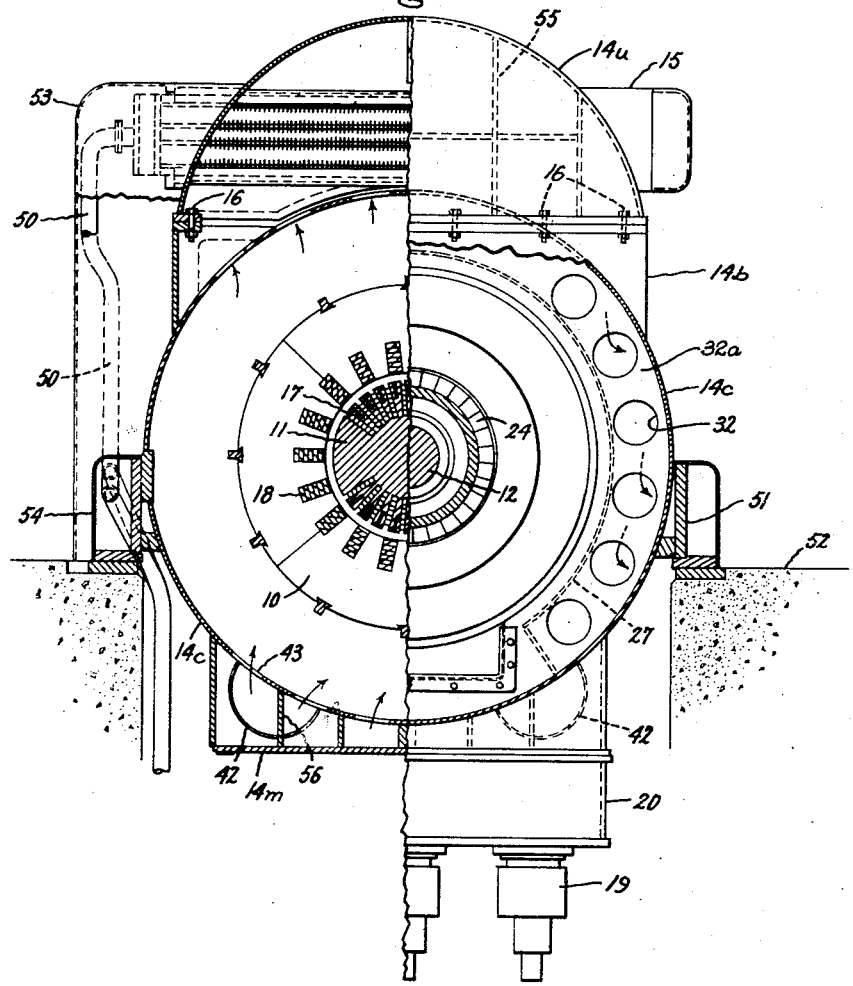

The features of my invention which I believe to be novel are set forth with particularity in the appended claims. My invention itself, however, both as to its organization and method of operation, together with further objects and advantages thereof, may best be understood by reference to the following description taken in connection with the accompanying drawing, in which Fig. 1 is a side elevational view, partly in section, of a turbine generator embodying my invention; and Fig. 2 is a cross-sectional view, the left half of which is taken along the line A—A and the right half of which is taken along the line B—B of Fig. 1.

As shown in the drawing, the machine is provided wtih a stator core member 10 and a cooperating rotor core member 11 having a shaft 12 which is journaled in bearings 13 in an outer housing 14 substantially enclosing the machine. As most clearly seen in Fig. 2, the outer housing comprises a main cylindrical housing portion or shell 14c, lower manifolds 14m, and a two-part top dome comprising a straight-sided bottom portion 14b permanently secured to the cylindrical housing portion, and an upper dome portion 14u removable with respect to said lower portion 14b. Transverse coolers 15 are located in the top dome upper portion 14u which, in accordance with the illustrated embodiment of the invention, is made removable by being fastened to the lower portion by bolts 16, which feature co-operates with other features relating to the transverse arrangement of coolers and axial passage of ventilating medium primarily outside of the cylindrical housing 14c, all as hereinafter more fully described, so that even in the case of machines of largest capacity, the overall dimensions and weight of each readily separable part can be constructed well within the capacity of available means of transportation.

The rotatable core member 11 is provided with slots containing a winding 17 (Fig. 2) adapted to be excited with direct current, and the stator core 10 is provided with slots containing a winding 18 constituting the output or armature winding and having leads extending through bushings 19 which, in the illustrated embodiment, pass through an extension 20 provided below the right-hand one of the two manifolds 14m, as viewed in Fig. 1, although obviously leads could be taken out at any position and at either or both ends of the machine.

The stator core 10 comprises a laminated core structure provided with radial cooling spaces 21 extending therethrough, for example as shown between spaced lamination stacks. This core structure is supported in the main cylindrical shell 14c by a plurality of annular web plates 22 surrounding the laminations and supporting them through the agency of key bar ribs 23 to which the laminations are attached. Plates 22 are secured, as by welding, to the inside of the shell 14c which is thus spaced from, while it encloses, the stator core member.

For the purpose of cooling the machine, the housing is filled with a suitable ventilating gas, such as hydrogen, and with the arrangement of the invention, the cooling gas circuit is such that all heated gas is discharged out of the top of the generator main cylindrical housing, above which it passes axially to and through the coolers, and all cooled gas is admitted to the generator through the air gap and the bottom manifolds. It may be assumed that the arrangement in the left-hand end of the machine as viewed in Fig. 1 is the same as that shown in the cutaway portion at the right-hand end, except opposite hand, and at each end of the machine there is a fan 24 mounted to be rotatable with shaft 12 and enclosed by a fan casing 25 defining with the end wall of casing 14 an inlet chamber 26. On its opposite side, each fan casing 25 cooperates with the end of the stator core and with a semi-annular axially extending baffle 27 to form an exhaust passageway 28 opposite the gap between the stator core and the rotor core at each end of the machine. As indicated by broken lines at the right-hand side of Fig. 2, this baffle 27 extends about 290 degrees or around all except the lowermost portion of the machine, connecting with the cylindrical main housing in the lower quadrants so that exhaust chamber 28 opens into the manifold 14m through openings 29 (see Fig. 1) provided in the ends of the lower part of the cylindrical casing 14c for this purpose. In the uppermost quadrants, the baffle 27 forms between itself and the main cylindrical housing 14c (and between the endmost support plate 22 and the outer radial extension of fan casing 25) a chamber 30 which, because the space between the outside end wall 14 and the fan casing 25 might not be large enough to conduct all the ventilating medium desired to have enter the fan after being discharged from the coolers 15, may be provided with entrance holes 31 (communicating with the enclosure within the top dome) and provided with exit holes 32 in the annular plate 32a (see Fig. 2) communicating with the intake opening 26 for the fan.

The machine is of the multiple radial ventilation type, characterized by the fact that ventilating medium flow is radially outward through some of the stator core radial ducts 21 (as shown in zones at the end of the machine) and radially inward through other radial ducts 21 (as shown through ducts toward the center) according to longitudinal distance along the machine from the ends. The path of the ventilating medium is indicated by the arrows 33 from which it will be seen that such gaseous cooling medium flows as follows:

a. Radially outward through ducts 21 between endmost stator core lamination stacks and then into three chambers 34 defined between the first four annular core supporting plates 22 (counting from either end toward the lengthwise center of the machine);

b. From a chamber 35 (between the fourth and fifth annular plates 22) radially inward through other ducts 21 to the air gap and from there axially inward and axially outward to join with gas from other sources;

c. From the air gap radially outward through additional ducts 21 to a chamber 36 (between the fifth and sixth annular plates 22);

d. From a chamber 37 (between the sixth and seventh annular plates 22) radially inward through adjacent ducts 21 to the air gap and thence axially in both directions;

e. Radially outward through centermost ducts 21 into a chamber 38 (between the seventh annular plate 22 from one end of the machine and the seventh annular plate 22 from the other end of the machine).

It is to be understood that where the annular chambers extend around the periphery of the stator core (as is the case with chambers 34–38, inclusive) the gas will spread to, or be collected throughout, the entire circumference, even though the entrance is only at the bottom or the exit is only at the top, as the case may be.

The ventilating medium discharged by each axial flow fan 24 will take parallel paths, one path being into the air gap and outward between stator core laminations to spaces 34, then through holes 39 in the top of the cylindrical shell into the top dome, where a baffle 40 directs the gas into and through an endmost cooler 15 from which it passes through the respective fan entrance chambers 26 and 30 back to the fan 24. Another parallel path from the discharge of each fan is radially outward over end turns of the stator windings 18, down on either side of the machine within the periphery of chamber 28, through the bottom openings 29 into the respective manifolds 14m and then dividing into two alternate routes: one through holes 41 into chamber 35, the other through each of two axially extending bulbous conduits 42 (see Fig. 2) arranged one in each lower quadrant outside the cylindrical shell 14c, and then inward through holes 43 (provided in the bottom of shell 14c) and into chamber 37. From chambers 35 and 37 the gas passes inward to the air gap, as previously described, and then outward through adjacent ducts, about half of such gas reaching chambers 36 from which it passes through holes 44 in the top of the shell, and the other half reaching chamber 38 from which it passes through holes 45 in the top of the shell. Gas exits through holes 44 and 45 into the top dome where it is directed by a top baffle 46 through one of the center coolers 15 after which it passes over baffle 40 and back to the fan inlet.

With the arrangement of the invention the coolers 15 can be shipped separately from the upper portion of the dome 14u, and access had to the bolts 16 through the cooler openings before the coolers are installed after the upper and lower portions of the top dome have been placed together at the final location. When installed, the coolers are piped to a suitable supply of fluid, such as water, as by means of pipes 50, and on the final site the dynamoelectric machine may be supported through feet 51 secured to the main cylindrical portion 14c and resting on a foundation 52 (Fig. 2) above the level of which, for the sake of appearance, the conduits 50 may be enclosed by light sheet metal coverings 53 and 54. Various stiffening members 55, 56 and gusset plates 57, 58 may be provided internally of the main portion of the generator, the top dome and the bottom manifolds, as desired.

While coolers have previously been located in what might be called a top dome, so far as I am aware all the prior art arrangements have been disadvantageous in that the dome has not been split and the angle of attachment of the entire dome to the cylindrical housing portion has required a permanently welded structure with no part of the dome removable and, further, in the prior art domes the coolers have been arranged axially so that, of necessity, they needed to be of the multi-pass type with the ventilating path divided by baffles so that the ventilating medium would flow back and forth across the same cooler between baffles as it progressed toward the fan inlet. With the present invention, however, not only is a major portion of the dome removable but the coolers are so placed that the ventilating medium passes through a cooler but once, and this latter feature has been found not only to decrease the size of stator supporting web plates but to greatly decrease cooler drop, thereby considerably reducing the requirements of each fan and contributing to the overall efficiency of the machine.

It has been quite customary in the past to mount the coolers for large dynamoelectric machines, such as turbine generators, extending axially between stator core and outer cylindrical housing but, with the desired multiple radial system of ventilation, this has necessitated a great plurality of openings in the core supporting annular webs not only to accommodate the coolers themselves but to allow axial passage of ventilating medium on the way to and from such coolers. The arrangement of the present invention eliminates the necessity of having holes or cutouts (in the annular supporting webs) for either coolers or for tubes and passages, and this elimination of all holes behind the stator core for this purpose permits the use of a shallower supporting structure for the same outside diameter of generator, while maintaining the same overall stiffness. Thus, within permissible shipping clearances, the construction of the invention permits a larger diameter of stator core and winding, and therefore a rotor of greater diameter, all of which combines to make possible a generator of greater capacity.

There is thus provided a device of the character described capable of meeting the objects hereinabove set forth, avoiding the necessity for assembly of a sub-divided outer frame or core, or winding either by the customer or by the manufacturers' representatives in the field. Since all that need be done in the field is to bolt on the top dome, install the coolers and the rotor, and connect the piping and wiring, there may be realized a very substantial saving, because each machine can be shipped with the laminated cores completedly stacked and wound, without the necessity of going to an expensive "double frame" structure.

As many modifications of my improved dynamoelectric machine construction will occur to those skilled in the art, I desire it to be understood that my invention is not to be limited to the particular arrangement shown and described, and I intend in the appended claims to cover all modifications which do not depart from the true spirit and scope of my invention.

What I claim as new and desire to secure by Letters Patent of the United States is:

1. A dynamoelectric machine having co-operating stator and rotor members with a gap therebetween, fan means for circulating a ventilating medium to cool said members, an outer housing supporting said members and comprising a main cylindrical portion surrounding said stator member and having openings through the top portion thereof and having openings through the bottom portion thereof, baffle, duct and additional enclosure means for directing ventilating medium so that all heated ventilating medium will be discharged out of said openings through said top portion and all cool ventilating medium will be admitted to the dynamoelectric machine partly through said gap between rotor and stator and the remainder through said openings through said bottom portion of said cylindrical housing portion, and a removable top dome portion having transversely arranged coolers adapted to receive ventilating medium from said openings in said cylindrical housing top portion.

2. An outer housing for a turbine generator having co-operating rotor and stator cores defining an air gap therebetween, said stator core comprising spaced stacks of laminations having radial ventilating passages therebetween, said housing comprising a main cylindrical shell spaced from and surrounding said stator core, a plurality of axially spaced annular web plates supporting said stator core from said shell, lower manifolds extending axially outside the lower portion of said shell, a two part top dome extending axially outside the upper portion of said shell and comprising a lower straight sided dome portion permanently secured to said shell and an upper dome portion removably secured to said lower dome portion, a plurality of coolers extending transversely through said upper dome portion, and fan and baffle means for circulating ventilating medium into said air gap and into said bottom manifolds and therefrom radially outward through at least some of said radial ventilating passages between stator core lamination stacks and through said shell and axially through said coolers.

3. A dynamoelectric machine comprising co-operating rotor and stator cores with a gap therebetween, said stator core having radial cooling spaces therein, a main cylindrical housing spaced from and enclosing said cores, a plurality of annular web plates supporting said stator core within said cylindrical housing and axially spaced to provide a plurality of annular chambers communicating with said radial cooling spaces, a two part top dome comprising a straight sided lower portion permanently secured to said cylindrical housing and an upper dome portion removably secured to said lower portion, a plurality of coolers each extending transversely through said upper dome portion, a fan at each end of said machine and secured to be rotatable with said rotor core, fan casings arranged at least one about each of said fans and defining fan inlet chambers and fan exhaust chambers adjacent the gap between said cores, said cylindrical housing having openings communicating between said top dome and said fan inlet chambers, bottom manifolds arranged at each end of said machine outside the bottom portion of said cylindrical housing, said cylindrical housing having openings communicating between each fan exhaust chamber and one of said manifolds, and said cylindrical housing having openings communicating between said bottom manifolds and some of said chambers provided by said axially spaced web plates, and said cylindrical housing having openings communicating between other of said chambers and said top dome containing said coolers, and baffle means for establishing ventilating medium circuits from said fans through said gap, outward through some of said radial cooling spaces into some of said chambers, axially through some of said coolers and back through said fan inlet passages, and from said fans through said manifolds to other of said chambers, inward through other of said radial cooling spaces, axially along said gap, outward through radial cooling spaces to some of said chambers, axially through other of said coolers and back through said fan inlet passages.

4. In a dynamoelectric machine having cooperating rotor and stator members with an air gap therebetween and fan means for circulating a ventilating medium to cool said members, the combination of a cylindrical outer housing member surrounding the stator and spaced radially therefrom, a plurality of annular web members axially spaced in the annular chamber defined between stator and housing, said cylindrical housing member having a plurality of ports in the bottom portion thereof for admitting coolant fluid to at least some of the annular spaces defined between said web members, the cylindrical housing member having also a plurality of ports through the upper portion thereof for discharging spent coolant from at least some of said annular spaces, walls defining passages exterior of the lower portion of the cylindrical housing member for conducting coolant gas from the fan means to said coolant inlet ports, and a removable top dome portion having a plurality of transversely disposed coolers adapted to receive ventilating medium from the discharge ports in the upper housing portion and defining passages for conducting coolant back to the fan means.

JOHN J. BAHN.

References Cited in the file of this patent

UNITED STATES PATENTS

| Number | Name | Date |
|---|---|---|
| 1,559,182 | Rice | Oct. 27, 1925 |
| 2,186,232 | Baudry | Jan. 9, 1940 |
| 2,488,387 | Elsie | Nov. 15, 1949 |

FOREIGN PATENTS

| Number | Country | Date |
|---|---|---|
| 379,039 | Great Britain | Aug. 25, 1932 |